US012624059B2

(12) United States Patent
Kim et al.

(10) Patent No.: US 12,624,059 B2

(45) Date of Patent: May 12, 2026

(54) ORGANOMETALLIC COMPOUND, PRECURSOR COMPOSITION COMPRISING SAME, AND METHOD FOR MANUFACTURING THIN FILM USING SAME

(71) Applicant: HANSOL CHEMICAL CO., LTD., Seoul (KR)

(72) Inventors: Hyo-Suk Kim, Jeollabuk-do (KR); Min-Sung Park, Daejeon (KR); Min-Hyuk Nim, Jeollabuk-do (KR); Jang-Hyeon Seok, Sejong-si (KR); Jung-Woo Park, Seoul (KR)

(73) Assignee: HANSOL CHEMICAL CO., LTD., Seoul (KR)

( * ) Notice: Subject to any disclaimer, the term of this patent is extended or adjusted under 35 U.S.C. 154(b) by 586 days.

(21) Appl. No.: 18/017,921

(22) PCT Filed: Aug. 3, 2020

(86) PCT No.: PCT/KR2020/010194

§ 371 (c)(1),
(2) Date: Jan. 25, 2023

(87) PCT Pub. No.: WO2022/025333

PCT Pub. Date: Feb. 3, 2022

(65) Prior Publication Data

US 2023/0257406 A1 Aug. 17, 2023

(30) Foreign Application Priority Data

Jul. 29, 2020 (KR) ........................ 10-2020-0094537

(51) Int. Cl.
*C07F 13/00* (2006.01)

(52) U.S. Cl.
CPC .................................... *C07F 13/00* (2013.01)

(58) Field of Classification Search
CPC .. C07F 13/00; C07F 1/08; C07F 15/06; C07F 15/02; C07F 15/04
See application file for complete search history.

(56) References Cited

U.S. PATENT DOCUMENTS

| | | | | |
|---|---|---|---|---|
| 10,344,381 | B2 * | 7/2019 | Strautmann | C07F 15/04 |
| 2005/0260446 | A1 * | 11/2005 | Mackenzie | H05B 33/14 313/506 |
| 2013/0190219 | A1 * | 7/2013 | Abrams | C11D 3/168 510/376 |
| 2015/0361109 | A1 * | 12/2015 | Smith | C07F 5/025 558/288 |
| 2021/0332074 | A1 * | 10/2021 | Park | C07F 15/06 |
| 2024/0218005 | A1 * | 7/2024 | Park | C23C 16/406 |

FOREIGN PATENT DOCUMENTS

| | | | |
|---|---|---|---|
| CN | 107278235 | A | 10/2017 |
| FR | 2806644 | A1 | 6/2003 |
| JP | 2007-153869 | A | 6/2007 |
| JP | 2017-524070 | A | 8/2017 |
| KR | 10-2017-0038855 | A | 4/2017 |
| KR | 10-1719526 | | 4/2017 |
| KR | 10-2019-0020148 | A | 2/2019 |
| KR | 10-1962355 | B1 | 3/2019 |

OTHER PUBLICATIONS

M. Hopkinson et al., 510 Nature, 485-496 (2014) (Year: 2014).*

IUPAC—Compendium of Chemical Terminology, Gold Book, p. 203 (2012) (Year: 2012).*

H. Schneider et al., European Journal of Inorganic Chemistry, 2600-2616 (2017) (Year: 2017).*

CAS Abstract and Indexed Compound, H. Schneider et al., European Journal of Inorganic Chemistry, 2600-2616 (2017) (Year: 2017).*

K. Assim et al, 619 Thin Solid Films, 265-272 (2016) (Year: 2016).*

A. Pakkala, et al, Atomic Layer Deposition (Ch. 8), in Handbook of Deposition Technologies for Films and Coatings, 364-391 (3rd Ed., 2010) (Year: 2010).*

J. Carlsson, et al, Chemical Vapor Deposition (Ch. 7), in Handbook of Deposition Technologies for Films and Coatings, 314-363 (3rd Ed., 2010) (Year: 2010).*

K. Jayasundara et al., 37 Organometallics, 1567-1574 (2018) (Year: 2018).*

Schneider, Heidi et al, Synthesis of Reactivity of NHC-Stabilized Iron (II)-Mesityl Complexes, European Journal of Inorganic Chemistry, 2017, 2017(19), 2600-2616.

International Search Report and Written Opinion from related PCT Application No. PCT/KR2020/010194, dated Aug. 3, 2020, 8 pages.

Normand, A. T. et al. Atom-efficient catalytic coupling of imidazolium salts with ethylene involving Ni-NHC complexes as intermediates: a combined experimental and DFT study. Organometallics. 2007, vol. 26, pp. 5352-5363. See abstract; formula 1; table 4; and figures 1, 4 and 6.

Freeman, L. A. et al. Low-nuclearity magnesium hydride complexes stabilized by N-heterocyclic carbenes. Dalton transactions. 2019, inner pp. 1-5. See inner p. 2, left column; formula 1; and figure 1.

(Continued)

*Primary Examiner* — Alexander R Pagano

(74) *Attorney, Agent, or Firm* — Brooks, Cameron & Huebsch, PLLC

(57) ABSTRACT

The present invention relates to a vapor deposition compound capable of being deposited as a thin film through vapor deposition and, in particular, to: an organometal-containing compound which can be applied to an atomic layer deposition (ALD) method or a chemical vapor deposition (CVD) method and has excellent reactivity, volatility, and thermal stability; a precursor composition comprising the organometallic compound; a method for manufacturing a thin film using the precursor composition; and an organometal-containing thin film manufactured using the precursor composition.

8 Claims, 6 Drawing Sheets

(56) References Cited

OTHER PUBLICATIONS

Chathurika R. K. Jayasundara, et al., Cobalt-Catalyzed C—H Borylation of Alkyl Arenes and Heteroarenes Including the First Selective Borylations of Secondary Benzylic C—H Bonds, «Organometallics», 37, May 17, 2018, 1567-1574.

* cited by examiner

ORGANOMETALLIC COMPOUND, PRECURSOR COMPOSITION COMPRISING SAME, AND METHOD FOR MANUFACTURING THIN FILM USING SAME

TECHNICAL FIELD

The present invention relates to a vapor deposition compound capable of depositing a thin film through vapor deposition and, specifically, to a novel organometallic compound that can be applied to atomic layer deposition or chemical vapor deposition and has excellent reactivity, volatility, and thermal stability, a precursor composition comprising the organometallic compound, a method for manufacturing a thin film using the precursor composition, and an organometal-containing thin film manufactured using the precursor composition.

BACKGROUND ART

An organometallic precursor thin film can form a metal thin film, an oxide thin film, and a nitride thin film which have various compositions, and is variously applied in the semiconductor field. As methods for forming thin films, there are deposition methods such as CVD and ALD, and according to the high integration and ultra-miniaturization of semiconductor materials, the need for ALD method, which has advantages such as uniform thin film manufacturing, thin film thickness controllability, and high step coverage, is being emphasized. At this time, the precursor for use in the ALD method also plays a very important role, and requires high volatility and thermal stability.

Among organometallic metal thin films, in particular, manganese metal thin films are applied to organic semiconductor electrodes and ferromagnetic electrode materials. Manganese oxide thin films can be used in electrode materials, electrochemical capacitors, soft magnetic materials, perovskite materials, lithium-based batteries of solid electrolytes, and catalysts. In addition, the manganese nitride thin film is a next-generation material that can be used as a copper diffusion barrier and a copper adhesion layer in the back-end-of-line copper connector of semiconductor material wiring, and various applications such as catalysts, batteries, memory devices, displays, and sensors are expected.

Among the representative organometallic precursors currently known, manganese (Mn) precursors include carbonyl compound $Mn_2(CO)_{10}$, cyclopentadiene compound $Mn(Cp)_2$, beta-diketonate compound $Mn(tmhd)_3$, amidinate compound $Mn(tBu\text{-}Me\text{-}amd)_2$, and the like. These are mostly solid compounds with relatively high melting points and low stability. In addition, when the thin film is deposited, impurity contamination may occur in the thin film. In addition, the compound $Mn(MeCp)(CO)_3$ composed of a combination of two ligands is a liquid compound, but there is a disadvantage in that it has a high boiling point and low stability of the compound. In addition, the compound $Mn(hfa)_2$(tmeda), which fills the coordination number by introducing an electron-donating ligand, has a much lower melting point than the beta-diketonate compound, but there is a disadvantage in that it is a solid compound and has a high deposition temperature. As such, it is necessary to develop a new organometallic precursor to improve the disadvantages of the precursors that have been used in the past.

DISCLOSURE

Technical Problem

The present invention is to solve the problems of the existing organometallic precursors mentioned as described above, and an object of the present invention is to provide an organometallic precursor compound for thin film deposition having excellent reactivity, thermal stability, and volatility.

Another object of the present invention is to provide a method for manufacturing a thin film using the organometallic precursor compound, and an organometal-containing thin film.

However, the problem to be solved by the present application is not limited to the above-mentioned problems, and other problems not mentioned will be clearly understood by those skilled in the art from the description below.

Technical Solution

The present invention is to develop a novel organometallic compound having a low melting point and excellent volatility in a low temperature range and a precursor composition comprising the same by introducing an imidazole ligand into an alkoxide ligand having excellent reactivity and volatility, and it is intended to provide a novel organometallic precursor consisting of a combination of an alkoxide and an imidazole ligand. Furthermore, it is intended to provide a novel organometallic precursor in which the substituent of the alkoxide ligand is modified.

One aspect of the present application provides an organometallic compound represented by Chemical Formula 1 below.

[Chemical Formula 1]

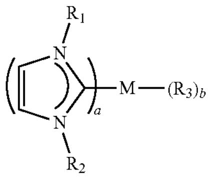

in Chemical Formula 1, M is Mn, Cu, Co, Fe, or Ni;

a is 2; b is 1 or 2 (provided that when M is Co, b is not 2);

$R_1$ and $R_2$ are each independently hydrogen or a linear or branched alkyl group having 1 to 4 carbon atoms; $R_3$ is $—OR_4$ or $—NR_5R_6$;

$R_4$ is hydrogen or a linear or branched alkyl group having 1 to 4 carbon atoms; and $R_5$ and $R_6$ are each independently hydrogen, a linear or branched alkyl group having 1 to 4 carbon atoms, or a linear or branched alkylsilyl group having 1 to 6 carbon atoms.

Another aspect of the present application provides a precursor composition for vapor deposition comprising the organometallic compound.

Yet another aspect of the present application provides a method for manufacturing a thin film, the method comprising a step of introducing the precursor composition for vapor deposition into a chamber.

Still another aspect of the present application provides an organometal-containing thin film manufactured using the precursor composition for vapor deposition.

Advantageous Effects

The precursor composition comprising the novel organometallic compound and the vapor deposition compound according to the present invention is a solid or low-viscosity liquid compound and has excellent volatility, enabling uniform thin film deposition.

Further, the precursor composition for vapor deposition according to the present invention has high thermal stability and reactivity so that excellent thin film properties, thickness and step coverage can be secured.

Such physical properties provide an organometallic precursor suitable for an atomic layer deposition method and a chemical vapor deposition method, and contribute to excellent thin film properties.

BEST MODE FOR CARRYING OUT THE INVENTION

Figure 1:
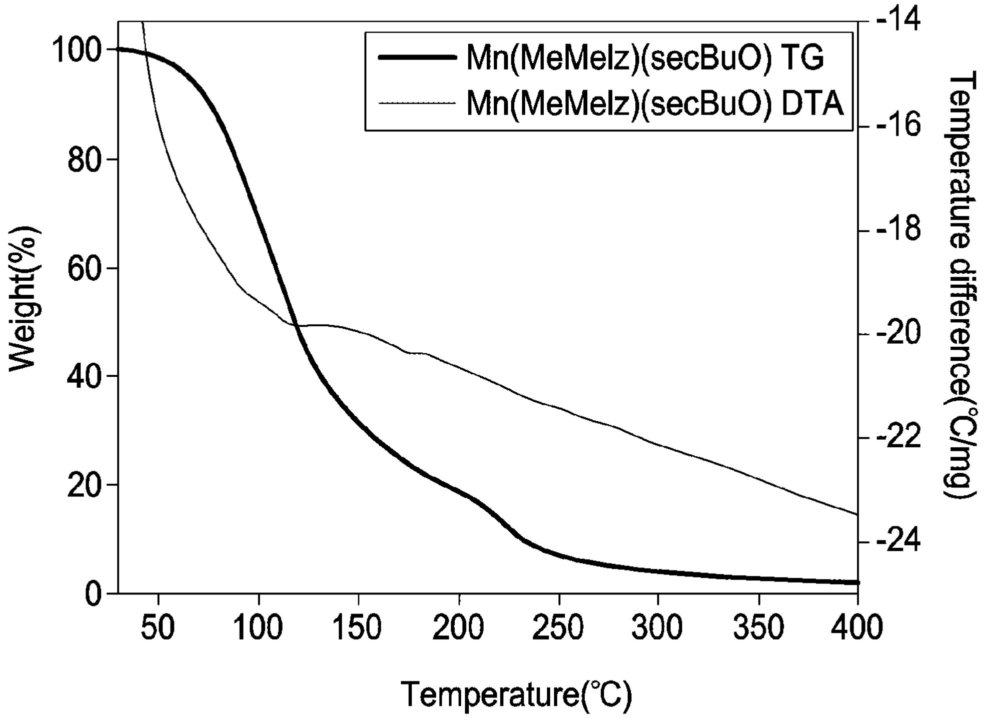
FIG. 1 is a thermal gravimetric-differential thermal analysis (TGDTA) graph of the $Mn(MeMeIz)_2(^{sec}BuO)_2$ compound of Example 1 of the present application.

Hereinafter, embodiments and examples of the present application will be described in detail so that those skilled in the art to which the present invention pertains can easily practice the present invention. However, the present application may be embodied in many different forms and is not limited to the embodiments and examples described herein.

The present invention relates to a novel organometallic compound applicable to an atomic layer deposition method or a chemical vapor deposition method and having excellent reactivity, volatility, and thermal stability, a precursor composition comprising the organometallic compound, a method for manufacturing a thin film using the precursor composition, and an organometal-containing thin film manufactured from the precursor composition.

Throughout the present specification, the term "alkyl" includes linear or branched alkyl groups having 1 to 4 carbon atoms and all possible isomers thereof. For example, the alkyl group may include a methyl group (Me), an ethyl group (Et), an n-propyl group ($^{n}$Pr), an iso-propyl group ($^{i}$Pr), an n-butyl group ($^{sec}$Bu), a tert-butyl group ($^{t}$Bu), an iso-butyl group ($^{i}$Bu), a sec-butyl group ($^{sec}$Bu), and isomers thereof, and the like, but may not be limited thereto.

Throughout the present specification, the term "Iz" refers to an abbreviation of "imidazole" and the term "btsa" refers to an abbreviation of "[bis(trimethylsilyl)amide]".

One aspect of the present application provides an organometallic compound represented by Chemical Formula 1 below.

[Chemical Formula 1]

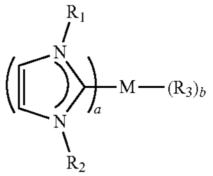

in Chemical Formula 1, M is Mn, Cu, Co, Fe, or Ni;

a is 2; b is 1 or 2 (provided that when M is Co, b is not 2):

$R_1$ and $R_2$ are each independently hydrogen or a linear or branched alkyl group having 1 to 4 carbon atoms; $R_3$ is $—OR_4$ or $—NR_5R_6$;

$R_4$ is hydrogen or a linear or branched alkyl group having 1 to 4 carbon atoms;

It is preferable that $R_5$ and $R_6$ are each independently hydrogen, a linear or branched alkyl group having 1 to 4 carbon atoms, or a linear or branched alkylsilyl group having 1 to 6 carbon atoms.

In one embodiment of the present application, more preferably $R_1$, $R_2$, and $R_4$ may be each independently any one selected from the group consisting of hydrogen, a methyl group, an ethyl group, an n-propyl group, an iso-propyl group, an n-butyl group, an iso-butyl group, a sec-butyl group, and a tert-butyl group, but is not limited thereto.

In one embodiment of the present application, more preferably $R_5$ and $R_6$ may be each independently any one selected from the group consisting of hydrogen, a methyl group, an ethyl group, an n-propyl group, an iso-propyl group, an n-butyl group, an iso-butyl group, a sec-butyl group, a tert-butyl group, a methylsilyl group, a dimethylsilyl group, a trimethylsilyl group, and a triethylsilyl group, but is not limited thereto.

In one embodiment of the present application, the organometallic compound may be a liquid or a solid at room temperature, preferably a liquid, but is not limited thereto.

In one embodiment of the present application, the compound represented by Chemical Formula 1 above may be an M (Imidazole) (Alkoxide) compound represented by Chemical Formula 2 below.

[Chemical Formula 2]

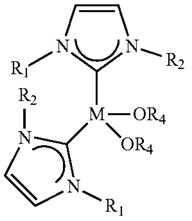

in Chemical Formula 2, M is Mn, Cu, Fe, or Ni; and it is preferable that $R_1$, $R_2$, and $R_4$ are each independently hydrogen or a linear or branched alkyl group having 1 to 4 carbon atoms.

For example, it is more preferable that $R_1$, $R_2$, and $R_4$ are each independently any one selected from the group consisting of hydrogen, a methyl group, an ethyl group, an n-propyl group, an iso-propyl group, an n-butyl group, an iso-butyl group, a sec-butyl group, and a tert-butyl group.

In one embodiment of the present application, the organometallic compound represented by Chemical Formula 2 above may be prepared through a reaction shown in Reaction Formula 1 below.

[Reaction Formula 1]

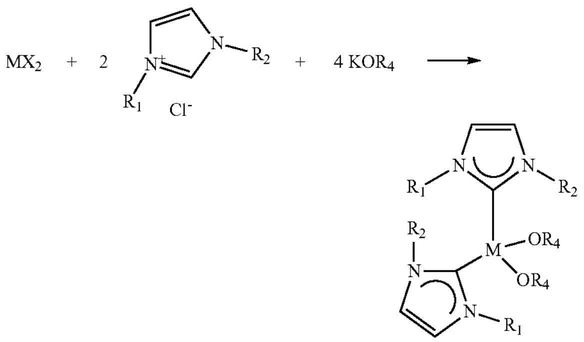

In Reaction Formula 1, M is Mn, Cu, Fe, or Ni; X is a halogen element (e.g., Cl, Br, or I); $R_1$, $R_2$, and $R_4$ are each independently hydrogen or a linear or branched alkyl group having 1 to 4 carbon atoms.

For example, examples of the Mn(Imidazole)(Alkoxide) compound in which the central metal (M) among the organic compounds represented by Chemical Formula 2 above is manganese may include the following manganese compounds, but are not limited thereto:

di-sec-butoxy-bis(1,3-dimethyl-2,3-dihydro-1H-imidazol-2-yl)manganese [Mn(MeMeIz)$_2$($^{sec}$BuO)$_2$];

di-sec-butoxy-bis(1-ethyl-3-methyl-2,3-dihydro-1H-imidazol-2-yl)manganese [Mn(MeEtIz)$_2$($^{sec}$BuO)$_2$]; and di-sec-butoxy-bis(1-methyl-3-propyl-2,3-dihydro-1H-imidazol-2-yl)manganese [Mn(MePrIz)$_2$($^{sec}$BuO)$_2$].

In one embodiment of the present application, the compound represented by Chemical Formula 1 above may be an M (Imidazole) (amide) compound characterized in that it is represented by Chemical Formula 3 below.

[Chemical Formula 3]

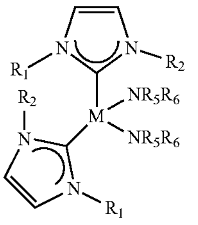

in Chemical Formula 3, M is Mn, Cu, Fe, or Ni; $R_1$ and $R_2$ are each independently hydrogen or a linear or branched alkyl group having 1 to 4 carbon atoms; and it is preferable that $R_5$ and $R_6$ are each independently hydrogen, a linear or branched alkyl group having 1 to 4 carbon atoms, or a linear or branched alkylsilyl group having 1 to 6 carbon atoms.

For example, it is more preferable that $R_1$ and $R_2$ are each independently any one selected from the group consisting of hydrogen, a methyl group, an ethyl group, an n-propyl group, an iso-propyl group, an n-butyl group, an iso-butyl group, a sec-butyl group, and a tert-butyl group; and it is more preferable that $R_5$ and $R_6$ are each independently any one selected from the group consisting of hydrogen, a methyl group, an ethyl group, an n-propyl group, an iso-propyl group, an n-butyl group, an iso-butyl group, a sec-butyl group, a tert-butyl group, a methylsilyl group, a dimethylsilyl group, a trimethylsilyl group, and a triethylsilyl group.

In one embodiment of the present application, the organometallic compound represented by Chemical Formula 3 above may be prepared through a reaction shown in Reaction Formula 2 below.

[Reaction Formula 2]

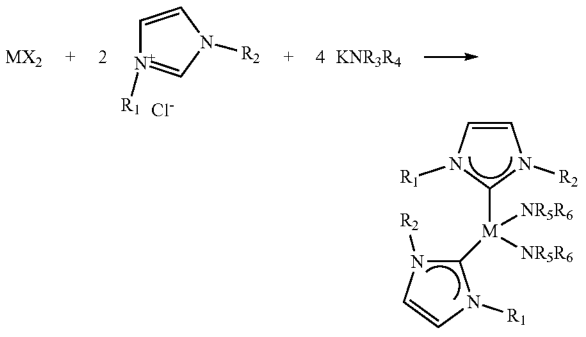

In Reaction Formula 2, M is Mn, Cu, Fe, or Ni; X is a halogen element (e.g., Cl, Br, or I); $R_1$ and $R_2$ are each independently hydrogen or a linear or branched alkyl group having 1 to 4 carbon atoms; and $R_5$ and $R_6$ are each independently hydrogen, a linear or branched alkyl group having 1 to 4 carbon atoms, or a linear or branched alkylsilyl group having 1 to 6 carbon atoms.

For example, examples of the Mn(imidazole)(amide) compound in which the central metal (M) among the organic compounds represented by Chemical Formula 3 above is manganese may include the following manganese compounds, but are not limited thereto:

bis(bis(trimethylsilyl)amino)-bis(1,3-dimethyl-2,3-dihydro-1H-imidazol-2-yl)manganese [Mn(MeMeIz)$_2$(btsa)$_2$];

bis(bis(trimethylsilyl)amino)-bis(I-ethyl-3-methyl-2,3-dihydro-1H-imidazol-2-yl)manganese [Mn(MeEtIz)h(btsa)$_2$]; and bis(bis(trimethylsilyl)amino)-bis(1-methyl-3-propyl-2,3-dihydro-1H-imidazol-2-yl)manganese [Mn(MePrIz)$_2$(btsa)b].

Another aspect of the present application provides a precursor composition for vapor deposition comprising the organometallic compound.

Another aspect of the present application provides a method for manufacturing a thin film, the method comprising a step of introducing the precursor composition for vapor deposition into a chamber. The step of introducing the vapor deposition precursor into a chamber may include a step of performing physisorption, chemisorption, or physisorption and chemisorption.

Another aspect of the present application provides an organometal-containing thin film manufactured using the precursor composition for vapor deposition.

All the contents described for the organometallic compound may be applied to the precursor for vapor deposition, the method for manufacturing a thin film, and the organometal-containing thin film according to the present invention, and detailed descriptions of overlapping parts have been omitted, but they may be equally applied even if the descriptions have been omitted.

In one embodiment of the present application, the method for manufacturing a thin film may include both of an atomic layer deposition (ALD) method of sequentially introducing the vapor deposition precursor and the reaction gas of the present invention and a chemical vapor deposition (CVD) method in which a film is formed by injecting the vapor deposition precursor and the reaction gas of the present invention continuously.

More specifically, the deposition method may include Metal Organic Chemical Vapor Deposition (MOCVD), Low Pressure Chemical Vapor Deposition (LPCVD), Pulsed Chemical Vapor Deposition (P-CVD), Plasma Enhanced Atomic Layer Deposition method (PE-ALD), or combinations thereof, but is not limited thereto.

In one embodiment of the present application, the method for manufacturing a thin film may further include a step of injecting one or more reaction gases selected from hydrogen ($H_2$), a compound (or mixture) containing oxygen (O) atoms, a compound (or mixture) containing nitrogen (N) atoms, or a compound (or mixture) containing silicon (Si) atoms as a reaction gas.

More specifically, at least one selected from water ($H_2O$), oxygen ($O_2$), hydrogen (H), ozone ($O_3$), ammonia ($NH_3$), hydrazine ($N_2H_4$) or silane may be used as the reaction gas, but is not limited thereto.

Specifically, water ($H_2O$), oxygen ($O_2$), and ozone ($O_3$) may be used as reaction gases in order to deposit an organometallic oxide thin film, and ammonia ($NH_3$) or hydrazine ($N_2H_4$) may be used as the reaction gas in order to deposit an organometallic nitride thin film.

Further, hydrogen ($H_2$) may be used as a reaction gas in order to deposit a metal organometallic thin film, and compounds of silanes may be used as a reaction gas in order to deposit an organometallic silicide (MnSi or $MnSi_2$) thin film.

The thin film manufactured by the method for manufacturing a thin film according to the present invention may be an organometallic metal thin film, an organometallic oxide thin film, an organometallic nitride thin film, or an organometallic silicide thin film, but is not limited thereto.

MODE FOR CARRYING OUT THE INVENTION

Hereinafter, the present invention will be described in more detail through Examples. However, the following Examples are intended to explain the present invention in more detail, and the scope of the present invention is not limited by the following Examples.

[Example 1] Synthesis of $Mn(MeMeIz)_2(^{sec}BuO)_2$

After $MnCl_2$ (1 eq, 13 g), 1,3-dimethylimidazolium chloride (2 eq), potassium 2-butoxide (4 eq), and tetrahydrofuran (THF) were put into a Schlenk flask and stirred at room temperature overnight, the solvent was removed by performing filtration under reduced pressure when the reaction was finished. The obtained compound was distilled under reduced pressure at 70° C. and 0.3 Torr to obtain an orange liquid.

The thermal gravimetric-differential thermal analysis results of the compound $[Mn(MeMeIz)_2(^{sec}BuO)_2]$ represented by Chemical Formula 2-1 below synthesized in Example 1 are shown in FIG. 1.

[Chemical Formula 2-1]

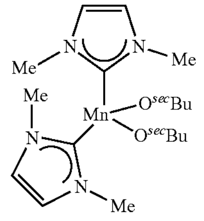

[Example 2] Synthesis of $Mn(MeEtIz)_2(^{sec}BuO)_2$

After $MnCl_2$ (1 eq, 13 g), 1-ethyl-3-methylimidazolium chloride (2 eq), potassium 2-butoxide (4 eq) and THF were put into a Schlenk flask and refluxed overnight, the solvent was removed by lowering the temperature to room temperature and performing filtration under reduced pressure when the reaction was finished. The obtained compound was distilled under reduced pressure at 70° C. and 0.2 Torr to obtain an orange liquid.

Figure 2:
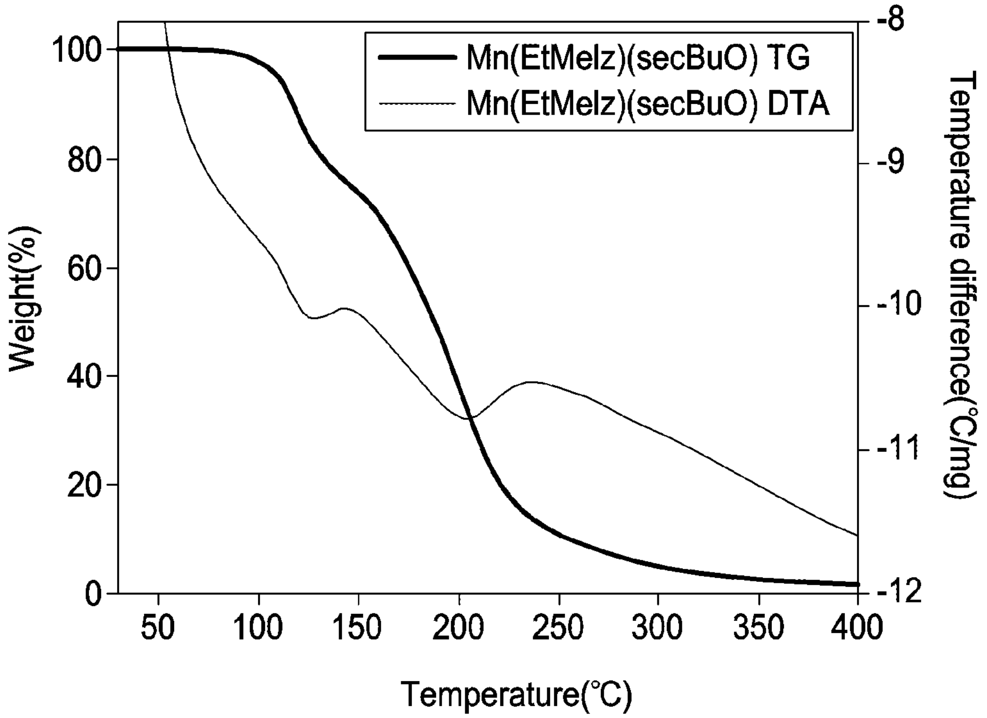
FIG. 2 is a thermal gravimetric-differential thermal analysis (TGDTA) graph of the $Mn(MeEtIz)_2(^{sec}BuO)_2$ compound of Example 2 of the present application.

The thermal gravimetric-differential thermal analysis results of the compound $[Mn(MeEtIz)_2(^{sec}BuO)_2]$ represented by Chemical Formula 2-2 below synthesized in Example 2 are shown in FIG. 2.

[Formula 2-2]

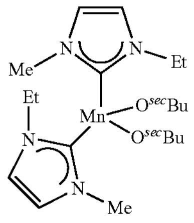

[Example 3] Synthesis of $Mn(MePrIz)_2(^{sec}BuO)_2$

After $MnCl_2$ (1 eq, 13 g), 1-methyl-3-propylimidazolium chloride (2 eq), potassium 2-butoxide (4 eq), and THF were put into a Schienk flask and stirred at room temperature overnight, the solvent was removed by performing filtration under reduced pressure when the reaction was finished. The obtained compound was distilled under reduced pressure at 65° C. and 0.2 Torr to obtain an orange liquid.

Figure 3:
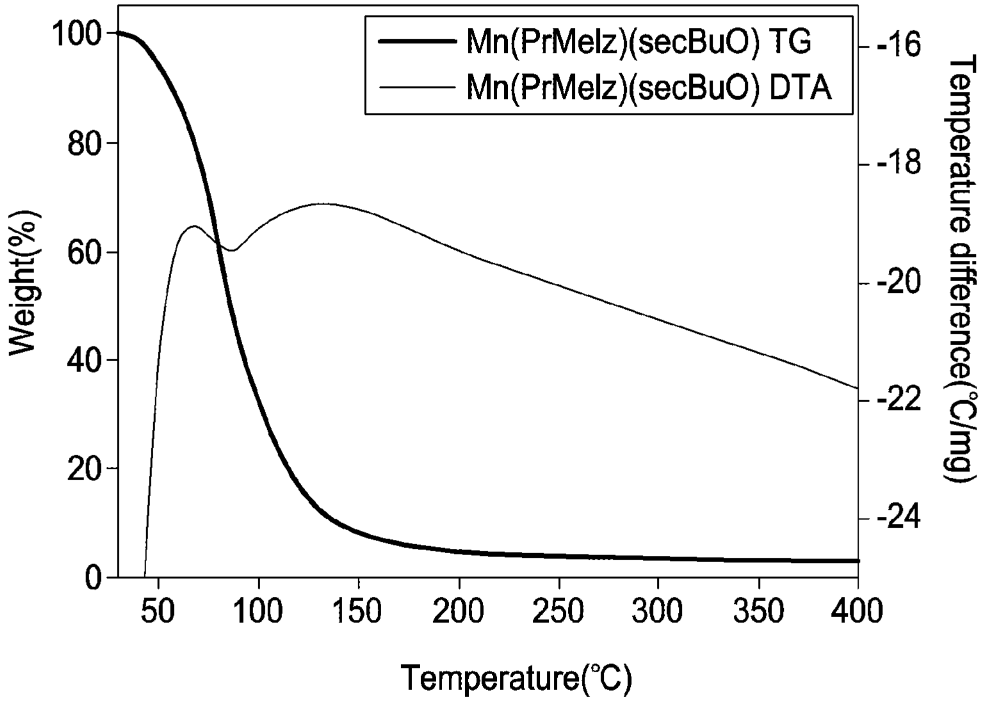
FIG. 3 is a thermal gravimetric-differential thermal analysis (TGDTA) graph of the $Mn(MePrIz)_2(^{sec}BuO)_2$ compound of Example 3 of the present application.

The thermal gravimetric-differential thermal analysis results of the compound $[Mn(MePrIz)_2(^{sec}BuO)_2]$ represented by Chemical Formula 2-3 below synthesized in Example 3 are shown in FIG. 3.

[Chemical Formula 2-3]

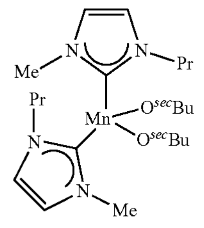

[Example 4] Synthesis of $Mn(MeMeIz)_2(btsa)_2$

After $MnCl_2$(1 eq, 3 g), 1,3-dimethylimidazolium chloride (2 eq), potassium bis-trimethylsilylamide (4 eq), and THF were put into a Schlenk flask and refluxed overnight, the solvent was removed by lowering the temperature to room temperature and performing filtration under reduced pressure when the reaction was finished. The obtained compound was sublimed at 90° C. and 1 Torr to obtain a yellow brown solid.

Figure 4:
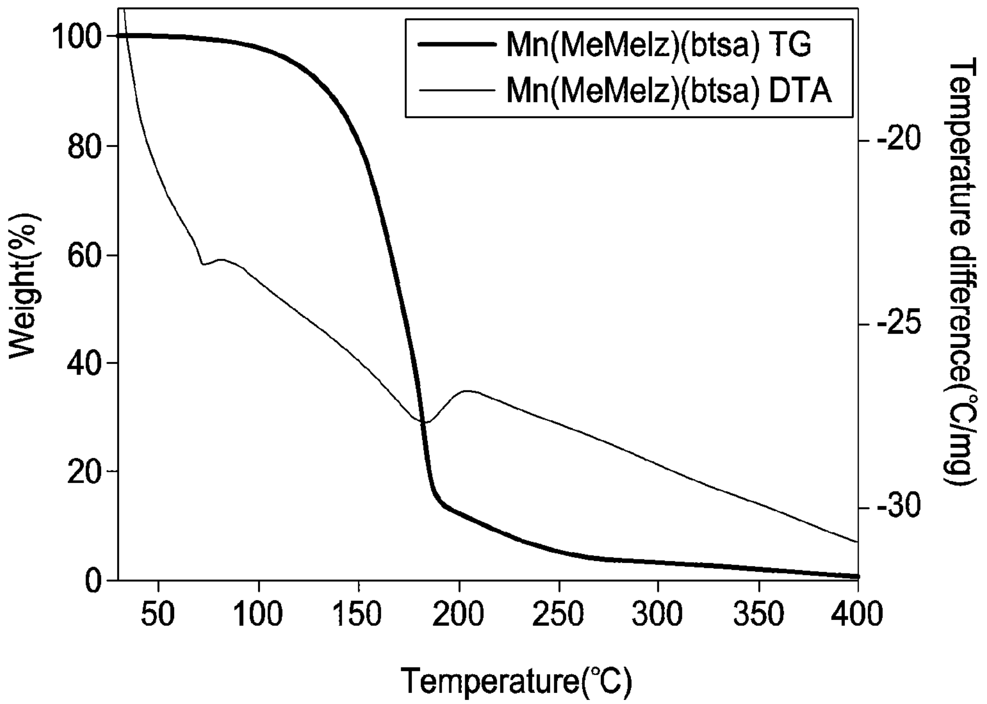
FIG. 4 is a thermal gravimetric-differential thermal analysis (TGDTA) graph of the $Mn(MeMeIz)_2(btsa)_2$ compound of Example 4 of the present application.

The thermal gravimetric-differential thermal analysis results of the compound [$Mn(MeMeIz)_2(btsa)_2$] represented by Chemical Formula 3-1 below synthesized in Example 4 are shown in FIG. 4.

[Chemical Formula 3-1]

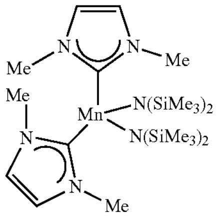

[Example 5] Synthesis of $Mn(MeEtIz)_2(btsa)_2$

After $MnCl_2$ (1 eq, 3 g), 1-ethyl-3-methylimidazolium chloride (2 eq), potassium bis-trimethylsilylamide (4 eq), and THF were put into a Schlenk flask and refluxed overnight, the solvent was removed by lowering the temperature to room temperature and performing filtration under reduced pressure when the reaction was finished. The obtained compound was distilled at 80° C. and 0.4 Torr to obtain an orange liquid.

Figure 5:
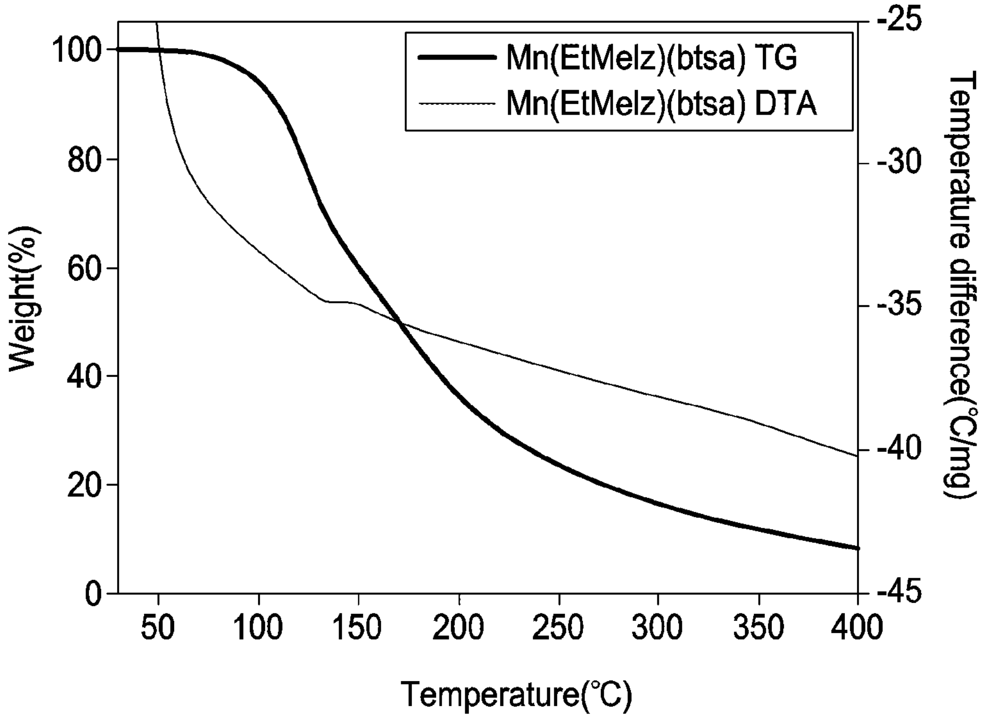
FIG. 5 is a thermal gravimetric-differential thermal analysis (TGDTA) graph of the $Mn(MeEtIz)_2(btsa)_2$ compound of Example 5 of the present application.

The thermal gravimetric-differential thermal analysis results of the compound [$Mn(MeEtIz)_2(btsa)_2$] represented by Chemical Formula 3-2 below synthesized in Example 5 are shown in FIG. 5.

[Chemical Formula 3-2]

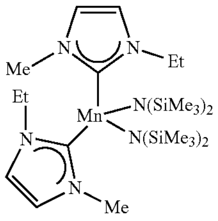

[Example 6] Synthesis of $Mn(MePrIz)_2(btsa)_2$

After $MnCl_2$ (1 eq, 3 g), 1-methyl-3-propylimidazolium chloride (2 eq), potassium bis-trimethylsilylamide (4 eq), and THF were put into a Schlenk flask and refluxed overnight, the solvent was removed by lowering the temperature to room temperature and performing filtration under reduced pressure when the reaction was finished. The obtained compound was distilled at 60° C. and 0.4 Torr to obtain an orange liquid.

Figure 6:
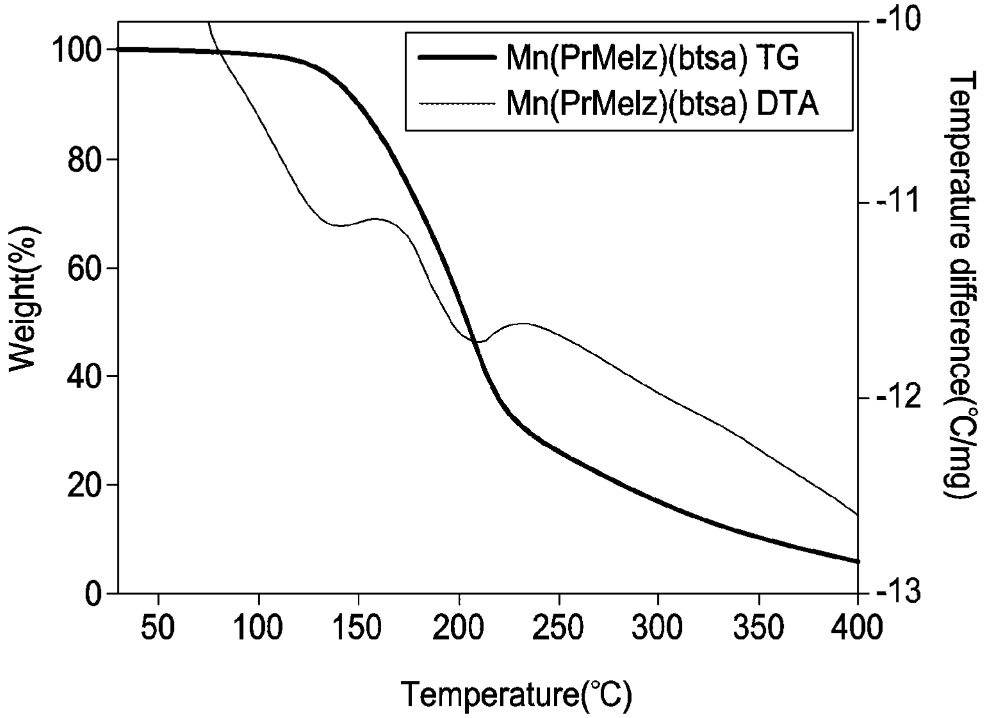
FIG. 6 is a thermal gravimetric-differential thermal analysis (TGDTA) graph of the $Mn(MePrIz)_2(btsa)_2$ compound of Example 6 of the present application.

The thermal gravimetric-differential thermal analysis results of the compound [$Mn(MePrIz)_2(btsa)_2$] represented by Chemical Formula 3-3 below synthesized in Example 6 are shown in FIG. 6.

[Chemical Formula 3-3]

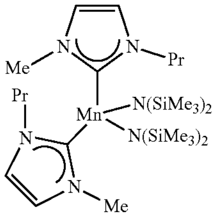

[Manufacturing Example 1] Manufacturing of Manganese-Containing Thin Film Using Atomic Layer Deposition (ALD) Method A manganese thin film was manufactured by alternately supplying any one novel manganese precursor of Examples 1 to 6 and a reaction gas including oxygen ($O_2$) onto a substrate. After supplying the precursor and the reaction gas, the precursor and reaction gas remaining in a deposition chamber were purged by supplying argon that is a purge gas, respectively. The supply time of the precursor was adjusted to 8 to 15 seconds, and the supply time of the reaction gas was also adjusted to 8 to 15 seconds. The pressure of the deposition chamber was adjusted to 1 to 20 Torr, and the deposition temperature was adjusted to 80 to 300° C.

Existing organometallic compounds have been difficult to use as precursors due to their disadvantage of being instable at room temperature. In contrast, the novel manganese precursor containing an imidazole ligand according to the present invention has advantages that it has relatively high thermal stability and high reactivity with an oxidative reaction gas at the same time.

Further, uniform thin film deposition is possible through the novel organometallic precursor containing an imidazole ligand according to the present invention, and thus excellent thin film properties, thickness and step coverage can be secured.

The scope of the present invention is indicated by the claims described later rather than the detailed description described above, and all changes or modified forms derived from the meaning and scope of the claims and equivalent concepts thereof should be interpreted as being included in the scope of the present invention.

INDUSTRIAL APPLICABILITY

The present invention relates to a vapor deposition compound capable of depositing a thin film through vapor deposition, and is specifically applicable to an atomic layer deposition method or a chemical vapor deposition method, and has excellent reactivity, volatility, and thermal stability.

Further, the precursor composition comprising the novel organometallic compound and the vapor deposition compound according to the present invention is a solid or low-viscosity liquid compound and has excellent volatility, enabling uniform thin film deposition, and has high thermal stability and reactivity to enable excellent thin film physical properties, thickness, and step coverage to be secured.

The physical properties as described above provide an organometal-containing precursor suitable for an atomic layer deposition method and a chemical vapor deposition method, and contribute to excellent thin film properties.

The invention claimed is:

1. An organometallic compound represented by the following Chemical Formula 1:

[Chemical Formula 1]

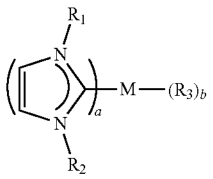

in Chemical Formula 1,

M is Mn, Cu, Co, or Ni;

a is 2;

b is 1 or 2 (provided that when Mis Co, b is not 2);

$R_1$ and $R_2$ are each independently hydrogen or a linear or branched alkyl group having 1 to 4 carbon atoms;

$R_3$ is —$OR_4$ or —$NR_5R_6$;

$R_4$ is hydrogen or a linear or branched alkyl group having 1 to 4 carbon atoms; and $R_5$ and $R_6$ are each independently hydrogen, a linear or branched alkyl group having 1 to 4 carbon atoms, or a linear or branched alkylsilyl group having 1 to 6 carbon atoms.

2. The organometallic compound of claim 1, wherein $R_1$, $R_2$, and $R_4$ are each independently any one selected from the group consisting of hydrogen, a methyl group, an ethyl group, an n-propyl group, an iso-propyl group, an n-butyl group, an iso-butyl group, a sec-butyl group, and a tert-butyl group.

3. The organometallic compound of claim 1, wherein $R_5$ and $R_6$ are each independently any one selected from the group consisting of hydrogen, a methyl group, an ethyl group, an n-propyl group, an iso-propyl group, an n-butyl group, an iso-butyl group, a sec-butyl group, a tert-butyl group, a methylsilyl group, a dimethylsilyl group, a trimethylsilyl group, and a triethylsilyl group.

4. A precursor composition for vapor deposition comprising the organometallic compound according to claim 1.

5. A method for manufacturing a thin film, the method comprising a step of introducing the precursor composition for vapor deposition according to claim 4 into a chamber.

6. The method of claim 5, wherein the method for manufacturing a thin film includes an atomic layer deposition (ALD) method or a chemical vapor deposition method (CVD) method.

7. The method of claim 5, further comprising a step of injecting one or more selected from hydrogen ($H_2$), a compound containing oxygen (O) atoms, a compound containing nitrogen (N) atoms, or a compound containing silicon (Si) atoms as a reaction gas.

8. The method of claim 7, wherein the reaction gas is any one or more selected from water ($H_2O$), oxygen ($O_2$), hydrogen ($H_2$), ozone ($O_3$), ammonia ($NH_3$), hydrazine ($N_2H_4$), or silane.

* * * * *